United States Patent Office.

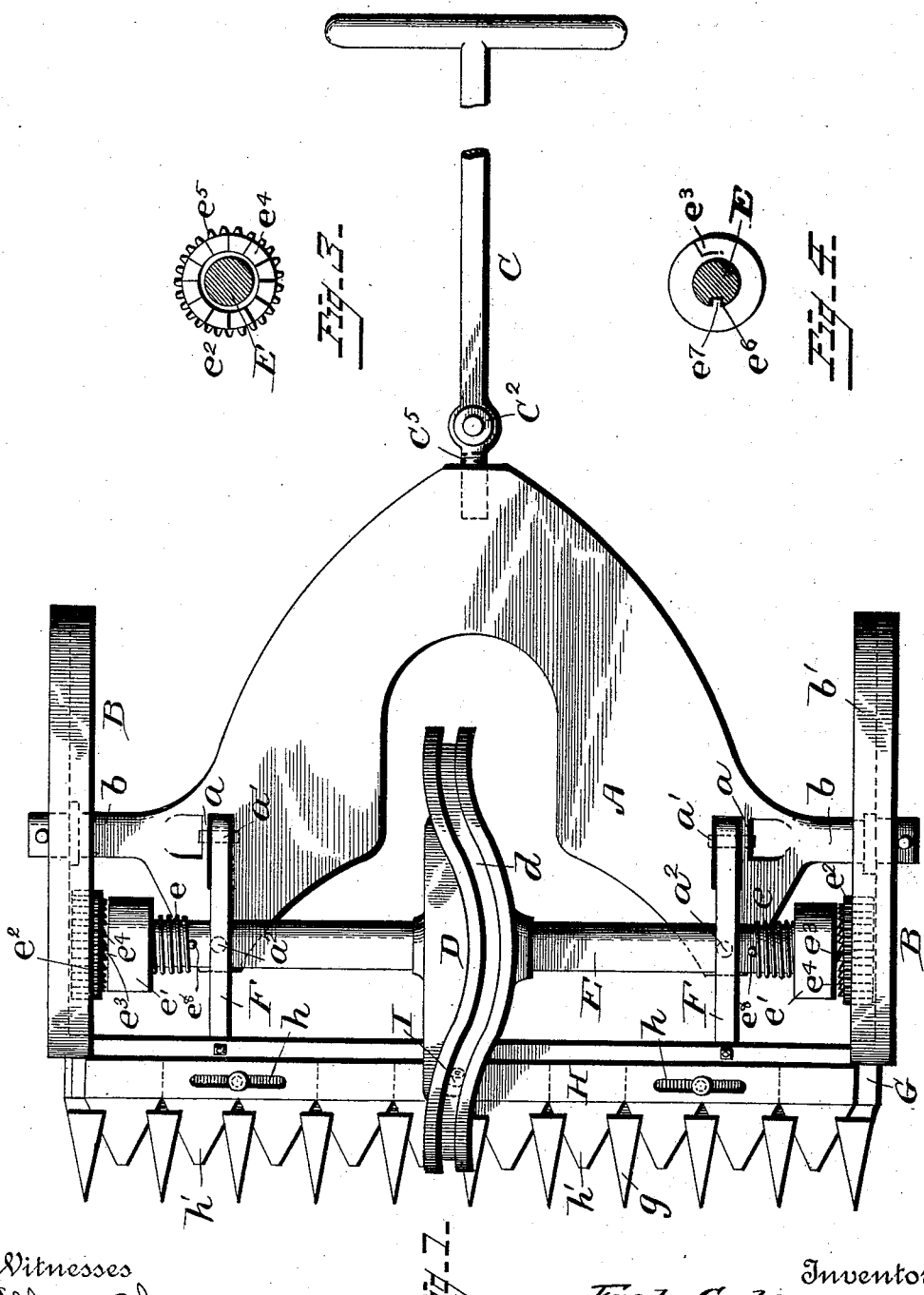

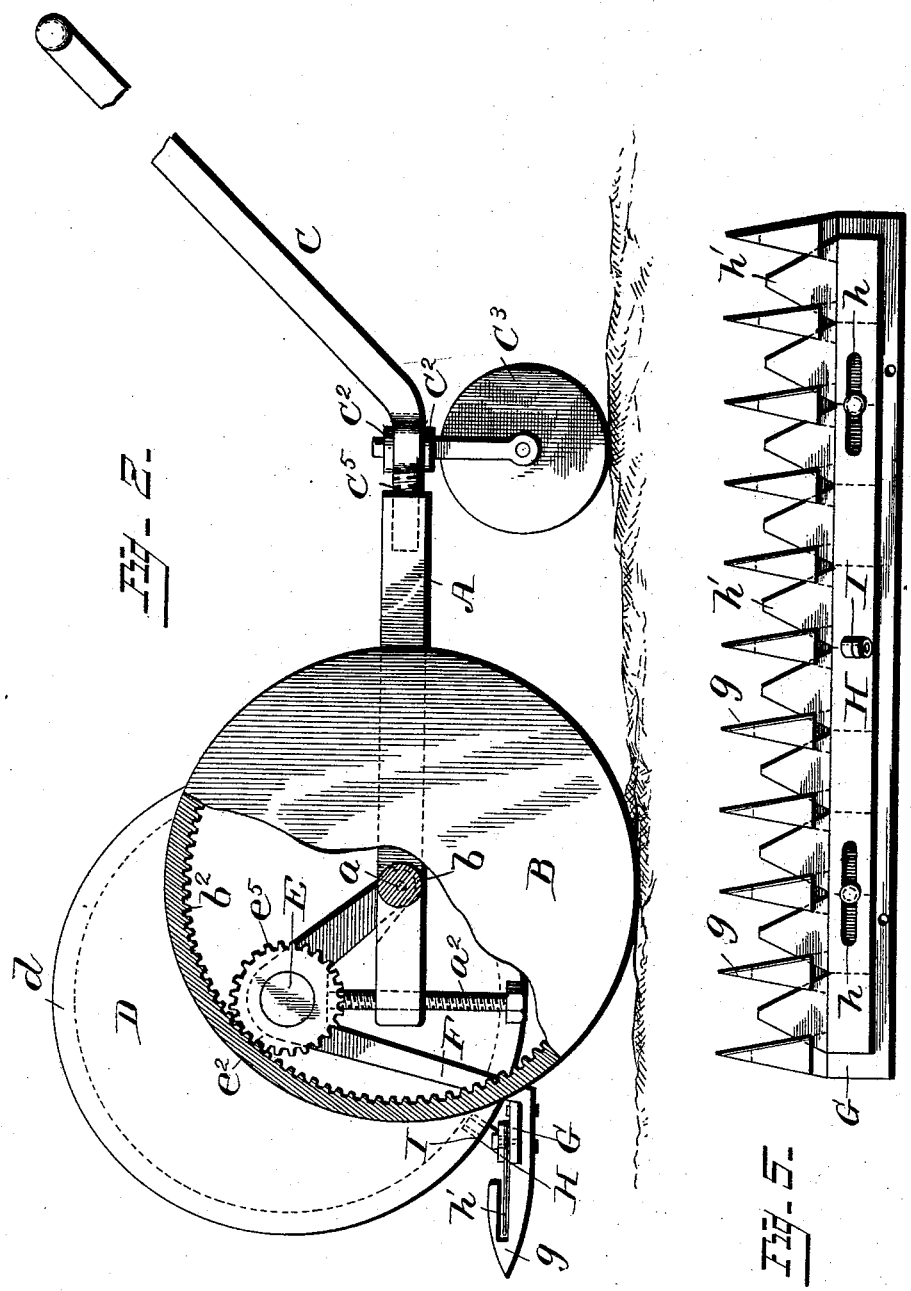

FRED CARLSON AND CHARLES G. CARLSON, OF TOPEKA, KANSAS.

LAWN-MOWER.

SPECIFICATION forming part of Letters Patent No. 494,120, dated March 28, 1893.

Application filed January 6, 1892. Serial No. 417,188. (No model.)

*To all whom it may concern:*

Be it known that we, FRED CARLSON and CHARLES G. CARLSON, citizens of the United States, residing at Topeka, in the county of Shawnee and State of Kansas, have invented certain new and useful Improvements in Lawn-Mowers; and we do hereby declare the following to be a full, clear, and exact description of the invention, such as will enable others skilled in the art to which it appertains to make and use the same.

Our invention is an improved lawn mower; and consists essentially of a novel and simple method of adapting the well known form of sickle or cutter bar for use in lawn mowers; in such a way that it may be adjusted independently of the supporting frames, the latter being supported so as to maintain a fixed relative distance from the surface of the ground to cut the grass very short or at any desired height, while at the same time the cutting knives may be extended flush with, or even beyond the outer side of the supporting drive wheels and thereby allow the grass to be cut close up to a wall, fence or building, or around trees, &c.

The invention consists of the novel features and the peculiar construction and combination of the parts which will be hereinafter more fully described and claimed and which are shown in the annexed drawings, in which;

Figure 1 is a top plan view of a mowing machine embodying our invention, a portion of the handle being broken away. Fig. 2 is a side elevation of the machine, partly in section and with parts removed. Fig. 3 is a view of the inner end of the pinion that is mounted on the cam shaft. Fig. 4 is a view of the active end of the clutch collar which co-operates with the pinion on the cam shaft. Fig. 5 is a top plan view of the cutting apparatus.

The peculiar U-shaped frame or axle A having spindles $b$ is supported by the drive or power wheels B, which are mounted on the said spindles $b$, and which are recessed on their inner sides $b'$, and have the interior gear cogs $b^2$, which are shown most clearly in Fig. 2. These cog teeth $b^2$ mesh with like spur gear cogs $e^5$ on the pinions $e^2$, which turn freely on the power or cam shaft E. On the inner ends of these pinions $e^2$, are ratchet teeth $e^4$ shown most clearly in Fig. 3. On the power shaft E are mounted the collars $e'$ which are free to move longitudinally thereon, but secured against revolving by the feather and spline connection $e^6$, $e^7$, which permits them to have a sliding or reciprocating movement on the shaft E without turning on it. Between the collars $e'$, and the fixed pins $e^8$ are open spiral springs $e$ which keep the clutch collars $e'$ close up against the pinions $e^2$ when the machine has a forward movement, and thereby cause the single ratchet cog $e^3$ on the collar $e'$ to engage with a tooth of the ratchet cogs $e^4$ of the pinions $e^2$, and thereby give motion to the shaft E when the pinions $e^2$ are caused to revolve by the drive wheels B. On the shaft E is fixed solidly the cam wheel D, having in its circumferential rim the slot $d$.

At the points in the frame, or axle A where the pillow blocks or arms F are pivoted to the projecting ears $a$, by the pins $a'$ there are depressions so as to allow the pivot or hinge point to be placed at the axis or center line of the spindles $a^2$ on which the drive wheels revolve. This is done to provide that at whatever elevation the arms F are, the proper and same pitch line will be maintained as between the spur gear pinion $e^2$, and the interior spur cogs $b^2$ of the drive wheels B. The pillow blocks or arms F are pierced to receive the shaft E which passes through, is supported or carried by and revolves in them.

At the front projective parts of the U-shaped frame or axle A, are the adjusting screws $a^3$, by means of which the elevation of the arms is regulated as the arms rest on and are supported by these screws and being pivoted to the frame or axle A at their rear ends the adjustment of the screws gives any desired elevation to the cutting apparatus. These arms F from the shaft E extend downward and have at their lower ends a suitable horizontal portion to which is fixed the bar G having attached to it the usual form of slotted guards $g$, and supporting the sickle bar H with knives $h'$ $h'$ &c. This bar H may be secured to the bar G by any suitable means which will afford reciprocating motion. The slots $h$ having vertical pins from the bar G is suggested as reducing friction to a minimum amount. From the center of the sickle bar H the stud I projects upward and rearward in the direction of the center of the eccentric motor wheel D. This stud is fitted with a collar at its outer end, which provides rolling friction while traveling in the cam slot $d$ in the rim of the cam wheel D. The cam wheel D is fixed on the shaft E and has two of its opposite edges bent away in one direction from the plane in which it revolves, while the other two opposite edges are bent away in the other direction. By this means the rim has a serpentine shape and the stud I which travels in the slot $d$, by one revolution of the wheel D, will be carried twice to the left and twice to the right of the plane of revolution giving a very rapid reciprocating motion to the sickle bar.

The operating handle C may be of suitable length size and material, and near the point $C^5$ where it is attached to the frame or axle A two lugs $C^2$ extend downward to support the small wheel $C^3$ which is designed to partially or normally support the rear side of the machine, and maintain a uniform level, which can be changed at will by the operator raising or lowering the handle.

In operation the several parts have the following action. When the operator pushes the machine forward, the supporting or drive wheels revolve, their interior spur gear cogs $b^2$, meshing with cogs on the pinion $e^2$ cause the said pinions to revolve also. The ratchet cogs $e^4$ (some one of them) being in mesh with the single ratchet cog $e^3$ on the collar $e'$, causes the collar and shaft E also to revolve, as the collar is held from turning on said shaft, by reason of the feather and spline connection, the cam wheel D being fixed to the shaft E revolves with it and the slot in its rim embracing the stud I on the sickle bar, gives the sickle bar reciprocating motion similar to that of a sickle bar in mowing and reaping machines. The relative size of the drive wheels B and pinions $e^2$, and the size of the cam wheel D may be so adjusted as to give a very rapid motion to the sickle bar. When the machine is pulled backward no motion is given to the sickle bar from the fact that while the pinions $e^2$ revolve, and are never out of gear with the drive wheels the ratchet cogs $e^4$ on their inner ends bearing against the sloping or beveled side of the ratchet cog $e^3$ of the collar $e'$ instead of against the square side of said cog, ride over the same and do not cause the collar $e'$ to revolve, but simply push it along the shaft E, by compressing the spiral spring $e$, permitting the cogs $e^3$ and $e^4$ to pass each other as long as the backward motion continues, but when it ceases the spiral spring instantly (as it has successively at each of the cogs $e^4$) presses the collar $e'$ up against the pinion $e^2$ and when a forward motion is given the machine the square sides of the cogs $e^3$ and $e^4$ being in contact the collar $e'$, shaft E and eccentric motor wheel D are at once again set in motion, and the sickle bar instantly again begins its work.

It will be observed that the axle or frame A is relatively fixed, being supported at three points B B and $C^3$ which are not in the same straight line, and that the cutting apparatus has an independent vertical adjustment by means of the arms F which are pivotally connected with the said frame or axle in axial alignment with the axis of the wheels B and their spindles $b$. This construction is essential in order that the pinions $e^2$ may at all times be in mesh with the cogs $b^2$ and obviate any binding between them.

Having thus described our invention, what we claim, and desire to secure by Letters Patent, is—

1. In a mower, the combination with the frame, and the drive wheels B B and the wheel $C^3$ for supporting the said frame at a fixed relative distance from the ground, of arms pivotally connected with the frame, a cam shaft carried by the said arms and driven by direct contact with the said drive wheels, the cutting apparatus attached to the arms and actuated by a cam on the said cam shaft, means for adjusting the said arms independently of the said frame to raise and lower the cutting mechanism, and a handle attached to the fixed frame, substantially as described.

2. In a mower, the combination with the frame, and the drive wheels B B and the wheel $C^3$ for supporting the said frame at a relative fixed distance from the ground of arms pivotally supported, the pivots being in axial line with the drive wheels, a cam shaft carried by the said arms and driven directly from the said drive wheels, the cutting apparatus carried by the said arms and operated directly from the cam on the cam shaft, means for adjusting the arms independently of the frame to raise and lower the cutting apparatus and a handle attached to the fixed frame, substantially as described.

3. In a mower, the combination with the frame A, and the drive wheels B B and the wheel $C^3$ for supporting the said frame at a relative fixed distance from the ground, of the arms F having pivotal connection with the frame A in axial line with the drive wheels, the cam shaft E mounted in the arms F and rotated by direct connection with the said drive wheels, the cutting apparatus carried by the said arms and driven from the cam wheel on the said cam shaft, the set screws for adjusting the arms independently of the said frame A to raise and lower the cutting mechanism, and the handle attached to the fixed frame, substantially as set forth.

4. The combination with the frame A, drive wheels B B and caster wheel $C^3$ to support the said frame at a relatively fixed distance from the ground, and the arms F having pivotal connection with the frame A in axial line with the drive wheels, of the cam shaft E mounted in the arms F and driven from the wheels B, the cutting apparatus carried by the arms F and actuated by the cam on shaft E, the set screws $a^2$ passing through the frame A and adapted to engage with the said arms F for adjusting the said arms to raise and lower the cutting apparatus independently of the frame A and the handle attached to the fixed frame whereby it will remain at a given distance from the ground whatever the position of the cutters, substantially as set forth.

In testimony whereof we affix our signatures in presence of two witnesses.

FRED CARLSON.
CHARLES G. CARLSON.

Witnesses:
J. LEE KNIGHT,
M. A. KNIGHT.